United States Patent
Kimura et al.

(10) Patent No.: US 10,534,349 B2
(45) Date of Patent: Jan. 14, 2020

(54) MACHINING PROGRAM EDITING APPARATUS, METHOD, AND STORAGE MEDIUM

(71) Applicant: FANUC CORPORATION, Yamanashi (JP)

(72) Inventors: Satoshi Kimura, Yamanashi-ken (JP); Akira Kanemaru, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 23 days.

(21) Appl. No.: 15/625,218

(22) Filed: Jun. 16, 2017

(65) Prior Publication Data

US 2017/0371316 A1 Dec. 28, 2017

(30) Foreign Application Priority Data

Jun. 24, 2016 (JP) .................................. 2016-125541

(51) Int. Cl.
*G06F 19/00* (2018.01)
*G05B 19/4097* (2006.01)

(52) U.S. Cl.
CPC .............. *G05B 19/4097* (2013.01); *G05B 2219/32128* (2013.01); *G05B 2219/35012* (2013.01); *G05B 2219/36266* (2013.01); *Y02P 90/265* (2015.11)

(58) Field of Classification Search
CPC ......... G05B 19/4097; G06F 8/30; G06F 8/31; G06F 2221/067
USPC .................. 700/184; 717/110, 114, 126, 127
See application file for complete search history.

(56) References Cited

U.S. PATENT DOCUMENTS

| | | | |
|---|---|---|---|
| 6,219,055 B1* | 4/2001 | Bhargava | G06T 17/10 345/420 |
| 2002/0031019 A1* | 3/2002 | Nakamura | G05B 19/4068 365/200 |
| 2006/0038829 A1* | 2/2006 | Morichi | G05B 19/4097 345/619 |
| 2015/0227133 A1* | 8/2015 | Kurohara | G05B 19/4067 700/186 |
| 2017/0160724 A1 | 6/2017 | Kikata et al. | |

(Continued)

FOREIGN PATENT DOCUMENTS

| | | |
|---|---|---|
| CN | 101224562 A | 7/2008 |
| JP | 6131023 A | 5/1994 |
| JP | 6131024 A | 5/1994 |

(Continued)

OTHER PUBLICATIONS

English Abstract and Machine Translation for Japanese Publication No. 2015-111338 A, published Jun. 18, 2015, 16 pgs.

(Continued)

*Primary Examiner* — Mohammad Ali
*Assistant Examiner* — Sheela Rao
(74) *Attorney, Agent, or Firm* — Fredrikson & Byron, P.A.

(57) ABSTRACT

A machining program editing apparatus includes a GUI unit configured to specify an indication route having two points located on an original machining path, as a start point and an end point, and a program editing unit configured to edit a machining program indicative of the original machining path to thereby form a new machining path by replacing an area from the start point to the end point on the original machining path, with the indication route specified through the GUI unit.

5 Claims, 15 Drawing Sheets

(56) References Cited

U.S. PATENT DOCUMENTS

2017/0160725 A1\* 6/2017 Kikata .................. B23Q 15/00

FOREIGN PATENT DOCUMENTS

| JP | 7311612 A | 11/1995 |
| JP | 2015111338 A | 6/2015 |
| WO | 2016035868 A1 | 3/2016 |
| WO | 2016035869 A1 | 3/2016 |

OTHER PUBLICATIONS

English Abstract and Machine Translation for Japanese Publication No. 07-311612 A, published Nov. 28, 1995, 17 pgs.
English Abstract and Machine Translation for Japanese Publication No. 06-131023 A, published May 13, 1994, 12 pgs.
English Abstract and Machine Translation for Japanese Publication No. 06-131024 A, published May 13, 1994, 15 pgs.
English Abstract and Machine Translation for Chinese Publication No. 101224562 A, dated Jul. 23, 2008, 14 pgs.

\* cited by examiner

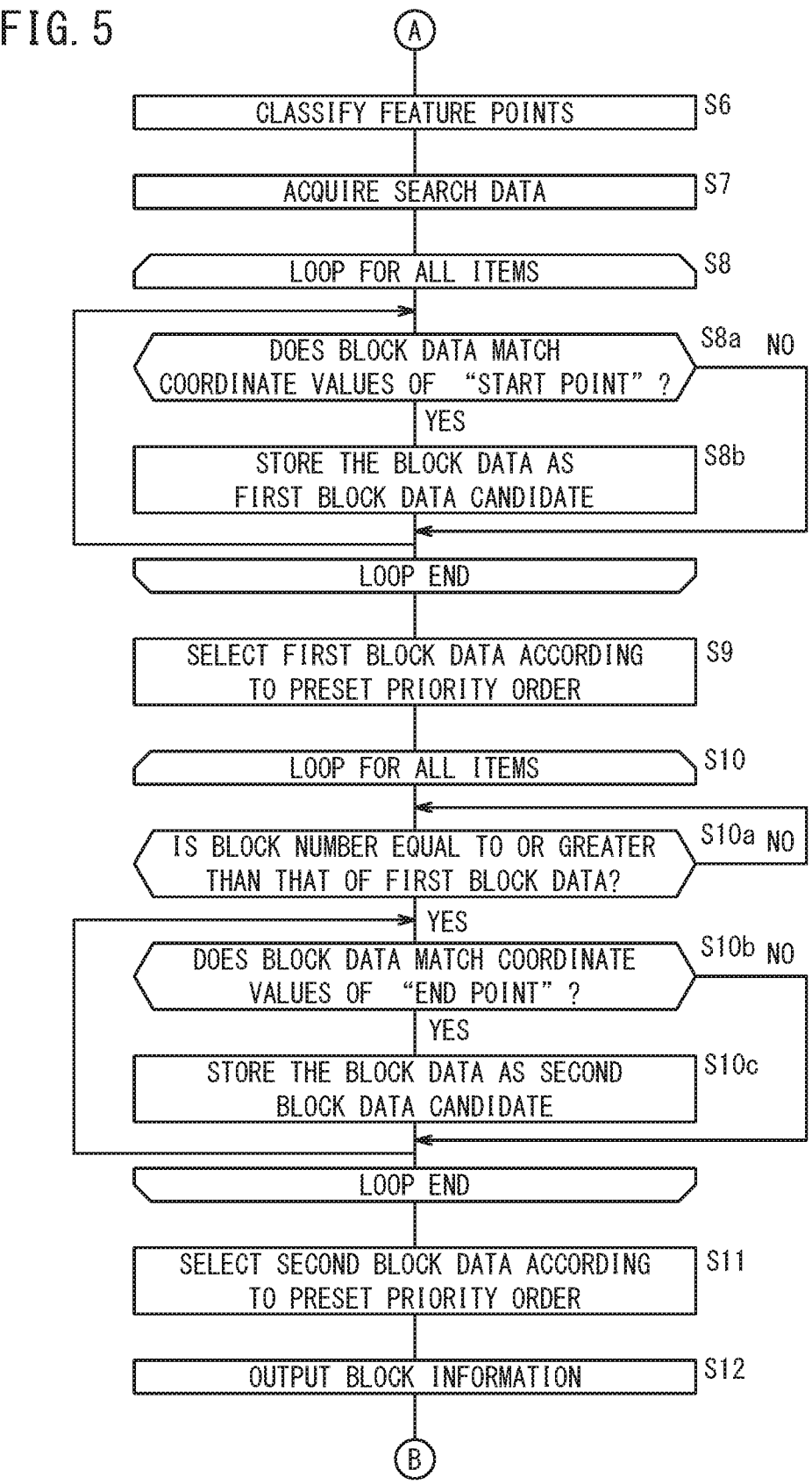

FIG. 9A

| BLOCK INFORMATION ||| B |
|---|---|---|---|
| BLOCK No. | COORDINATE VALUES | TYPE | ... |
| 0000001 | X=10.000, Y=10.000 | START POINT | ... |
| 0000002 | X=100.000, Y=100.000 | END POINT | ... |

FIG. 9B

| BLOCK INFORMATION ||||| B |
|---|---|---|---|---|
| BLOCK No. | COORDINATE VALUES | TYPE | ... | COMMAND CONTENT |
| 0000001 | X=10.000, Y=10.000 | START POINT | ... | NONE |
| NULL | X=10.000, Y=10.000 | START POINT | ... | ADD |
| NULL | X=100.000, Y=100.000 | END POINT | ... | ADD |
| 0000002 | X=100.000, Y=100.000 | END POINT | ... | NONE |

FIG. 9C

| BLOCK INFORMATION ||||| B |
|---|---|---|---|---|
| BLOCK No. | COORDINATE VALUES | TYPE | ... | COMMAND CONTENT |
| 0000001 | X=10.000, Y=10.000 | START POINT | ... | DELETE |
| NULL | X=10.000, Y=10.000 | START POINT | ... | ADD |
| NULL | X=100.000, Y=100.000 | END POINT | ... | ADD |
| 0000002 | X=100.000, Y=100.000 | END POINT | ... | DELETE |

FIG. 11A

| | COMMAND INFORMATION | | C |
|---|---|---|---|
| BLOCK No. | CODE STATEMENT | COMMAND CONTENT |
| 0000001 | N001 G90 G00 Y100.000; | DELETE |
| NULL | NULL | ADD |
| NULL | NULL | ADD |
| 0000002 | N002 X100.000; | DELETE |

FIG. 11B

| | COMMAND INFORMATION | | C |
|---|---|---|---|
| BLOCK No. | CODE STATEMENT | COMMAND CONTENT |
| 0000001 | N001 G90 G00 Y100.000; | DELETE |
| NULL | X100.000 Y100.000; | ADD |
| 0000002 | N002 X100.000; | DELETE |

FIG. 11C

| | COMMAND INFORMATION | | C |
|---|---|---|---|
| BLOCK No. | CODE STATEMENT | COMMAND CONTENT |
| 0000001 | N001 G90 G00 Y100.000; | DELETE |
| NULL | N001 G90 G00 X100.000 Y100.000; | ADD |
| 0000002 | N002 X100.000; | DELETE |

FIG. 13A

| COMMAND INFORMATION ||| 
|---|---|---|
| BLOCK No. | CODE STATEMENT | COMMAND CONTENT |
| 0000001 | N001 G90 G00 Y100.000; | DELETE |
| NULL | N001 G90 G00 X100.000 Y100.000; | ADD |
| 0000002 | N002 X100.000; | DELETE |
| NULL | N002; | ADD |

MACHINING PROGRAM EDITING APPARATUS, METHOD, AND STORAGE MEDIUM

CROSS-REFERENCE TO RELATED APPLICATION

This application is based upon and claims the benefit of priority from Japanese Patent Application No. 2016-125541 filed on Jun. 24, 2016, the contents of which are incorporated herein by reference.

BACKGROUND OF THE INVENTION

Field of the Invention

The present invention relates to a machining program editing apparatus, a method, and a storage medium that edit a machining program for causing a machine tool to machine a workpiece along a machining path composed of two or more sections.

Description of the Related Art

Conventionally, a variety of machining program editors that enable edition of machining programs for controlling machine tools have been developed.

International Publication No. WO 2016/035868 discloses an editing assistance device that displays a machining path and a code statement at the same time and moves a cursor to a position corresponding to a point designated by the displayed code statement, by designating a partial path of the displayed machining path. With this, the publication further discloses that an operator can comprehend the machining path and the code statement in relation to each other, hence this configuration can assist edition of the machining program.

SUMMARY OF THE INVENTION

However, in the device configuration proposed by International Publication No. WO 2016/035868, the operator can comprehend the relationship between the machining path and the code statement but needs to decide details of change with reference to the code statements before and after the designated point, manually move the cursor and edit the code statements. As a result, this device entails the problem that it is not as effective in reducing the man-hour as expected.

The present invention has been devised to solve the above-described problem, and it is therefore an object of the present invention to provide a machining program editing apparatus, a method and a storage medium that can reduce the man-hour for editing a machining program.

According to a first aspect of the present invention, there is provided a machining program editing apparatus for editing a machining program that causes a machine tool to machine a workpiece along an actual machining path including two or more sections, containing a graphical user interface (GUI) unit configured to display an original machining path in a display area and specify an indication route having two points located on the original machining path respectively as a start point and an end point, in accordance with an input operation performed by an operator through the display area, and a program editing unit configured to edit the machining program indicative of the original machining path to thereby form a new machining path by replacing an area from the start point to the end point on the original machining path, with the indication route specified by the GUI unit.

In this way, a new machining path can be created by replacing an area from a start point to an end point in the original machining path with an indication route specified through the GUI unit. Owing thereto, the operator can automatically perform edition of the machining program as intended by input operation through a visually easy-to-understand interface, without directly handling code statements of the machining program. As a result, it is possible to considerably reduce the man-hour for editing the machining program.

In the first aspect of the invention, the apparatus may further include a command information generating unit configured to generate command information indicative of block numbers and command content in the machining program, and the program editing unit may, in accordance with the command content of the command information generated by the command information generating unit, add, change or delete a code statement at a position corresponding to each of the block numbers, and edit the machining program.

Also, in the first aspect of the invention, the command information generating unit may generate the command information, based on the coordinate values of the start point and the coordinate values of the end point, specified by the code statements corresponding to each of the block numbers.

In the first aspect of the invention, the apparatus may further include a data acquisition unit configured to analyze the machining program and acquire search data in which feature points of the sections are associated with the block numbers, and a block information searching unit configured to search the search data acquired by the data acquisition unit for one of the block numbers in which one of the feature points of the sections coincides with the start point or the end point. Since, after the search data containing the data needed for editing is acquired from the machining program having a large amount of data, a searching process is performed based on the search data, this makes it possible to markedly reduce the time required for searching for feature points in the sections and block numbers.

In the first aspect of the invention, the program editing unit may edit the machining program by assigning a specific character for partially invalidating readout of data, to the code statement. This configuration makes it possible to easily validate the content of a code statement by deleting the specific character afterwards.

Further, in the first aspect of the invention, the program editing unit may edit the machining program by deleting the code statement to which the specific character is assigned, together with the specific character, in accordance with a confirming operation performed by the operator using the GUI unit. This feature makes it possible to prevent automatic confirmation of the edited content of the machining program against operator's intention.

In the first aspect of the invention, the GUI unit may lay the indication route on the original machining path in the display area and display the indication route in a display form different from that of the area from the start point to the end point on the original machining path. This enables the operator to grasp the difference between the machining paths before and after modification at a glance.

Moreover, in the first aspect of the invention, the apparatus may further include a communication unit configured to receive the machining program created by an external device, and the machining program received by the communication unit may be edited. Owing to the above feature, when the machining program editing apparatus does not have a machining program creating function, it is possible to modify and complete the machining program by the apparatus alone without re-creating the program using an external device.

According to the second aspect of the present invention, there is provided a machining program editing method for editing a machining program that causes a machine tool to machine a workpiece along an actual machining path including two or more sections, the method comprising the steps, implemented by a machining program editing apparatus, of, displaying an original machining path in a display area of a GUI unit, specifying an indication route having two points located on the original machining path respectively as a start point and an end point, in accordance with an input operation performed by an operator using the GUI unit, and editing the machining program indicative of the original machining path to thereby form a new machining path by replacing an area from the start point to the end point on the original machining path, with the indication route specified.

According to the third aspect of the present invention, there is provided a storage medium storing an editing program for editing a machining program that causes a machine tool to machine a workpiece along an actual machining path including two or more sections, and the editing program causes a machining program editing apparatus to execute: a displaying step of displaying an original machining path in a display area of a GUI unit, a specifying step of specifying an indication route having two points located on the original machining path as a start point and an end point, in accordance with an input operation performed by an operator through the GUI unit, and an editing step of editing the machining program indicative of the original machining path to thereby form a new machining path by replacing an area from the start point to the end point on the original machining path, with the indication route specified.

According to the machining program editing apparatus, method, and storage medium of the present invention, it is possible to reduce the man-hour for editing the machining program.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a second flowchart for explaining the operation of the numerical controller shown in FIGS. 1 and 2;

FIGS. 9A to 9C are transition diagrams showing a process of updating block information;

FIGS. 11A to 11C are transition diagrams showing a process of updating instruction information;

FIG. 13A is a diagram showing the final content of command information;

FIG. 13B is a diagram showing the content of a machining program under editing;

DESCRIPTION OF THE PREFERRED EMBODIMENTS

A preferred embodiment of a machining program editing apparatus according to the present invention will be described below in detail with reference to the accompanying drawings in relation to a machining program editing method and an editing program.

[Configuration Diagram of Numerical Controller 10]

Figure 1:
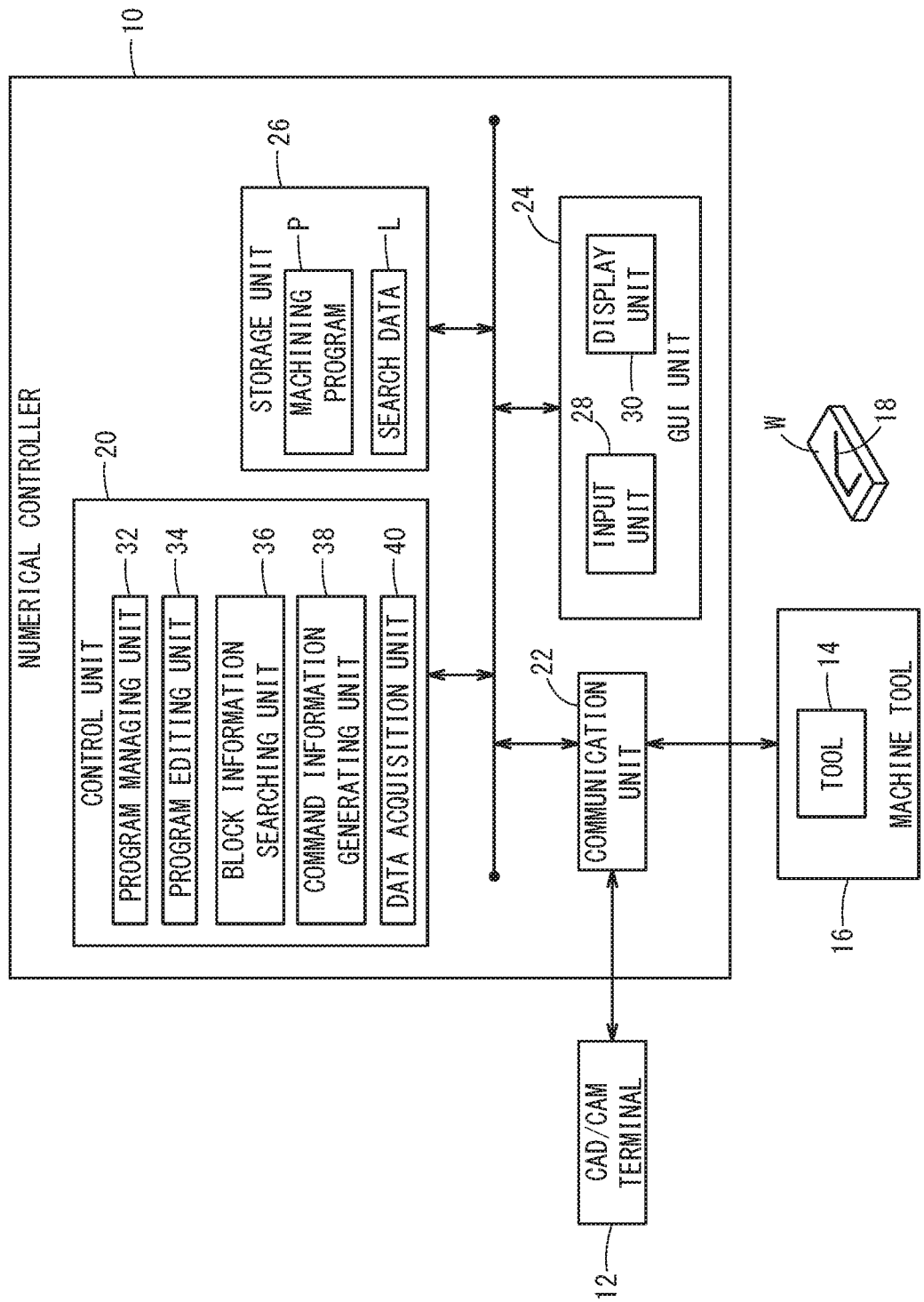
FIG. 1 is a configuration diagram showing a numerical controller as a machining program editing apparatus according to an embodiment of the present invention.

FIG. 1 is a configuration diagram of a numerical controller 10 as a machining program editing apparatus in this embodiment. The numerical controller 10 is a higher-level host device that uses a machining program P created by a CAD (Computer Aided Design)/CAM (Computer Aided Manufacturing) terminal 12 to comprehensively control a machine tool 16 (one or more lower-level devices) having a tool 14.

Hereinbelow, in order to clearly distinguish differences in content, machining programs P before editing, during editing, and after editing may be referred to as P1, P2, and P3, respectively.

In accordance with the machining program P, the machine tool 16 performs a machining process on a workpiece W along an actual machining path 18 composed of one or more sections while relatively moving the tool 14 to the workpiece W.

The numerical controller 10 is a computer including a control unit 20, a communication unit 22, a GUI (Graphical User Interface) unit 24, and a storage unit (storage medium) 26.

The communication unit 22 is an interface that transmits and receives electric signals with respect to external devices. With this, the numerical controller 10 can acquire the machining program P from the CAD/CAM terminal 12 via the communication unit 22 and also can output control signals for controlling the operation of the machine tool 16 to the machine tool 16.

The GUI unit 24 is a user interface having an input function of an input unit 28 and an output function of a display unit 30 (display device) in combination. The input unit 28 may include, for example, a mouse, a keyboard, a touch sensor, and a microphone.

The storage unit 26 stores programs, data, and the like necessary for the control unit 20 to control individual components. The storage unit 26 may be configured as a non-transitory computer-readable storage medium. In the example of this figure, the above-described machining program P or after-mentioned search data L is stored in the storage unit 26.

The control unit 20 is composed of a processor, either a CPU (Central Processing Unit) or MPU (Micro-Processing Unit). The control unit 20 reads out and executes a program (not shown) stored in the storage unit 26 to thereby realize the functions of a program managing unit 32, a program editing unit 34, a block information searching unit 36, a command information generating unit 38, and a data acquisition unit 40.

[Functional Block Diagram of Numerical Controller 10]

Figure 2:
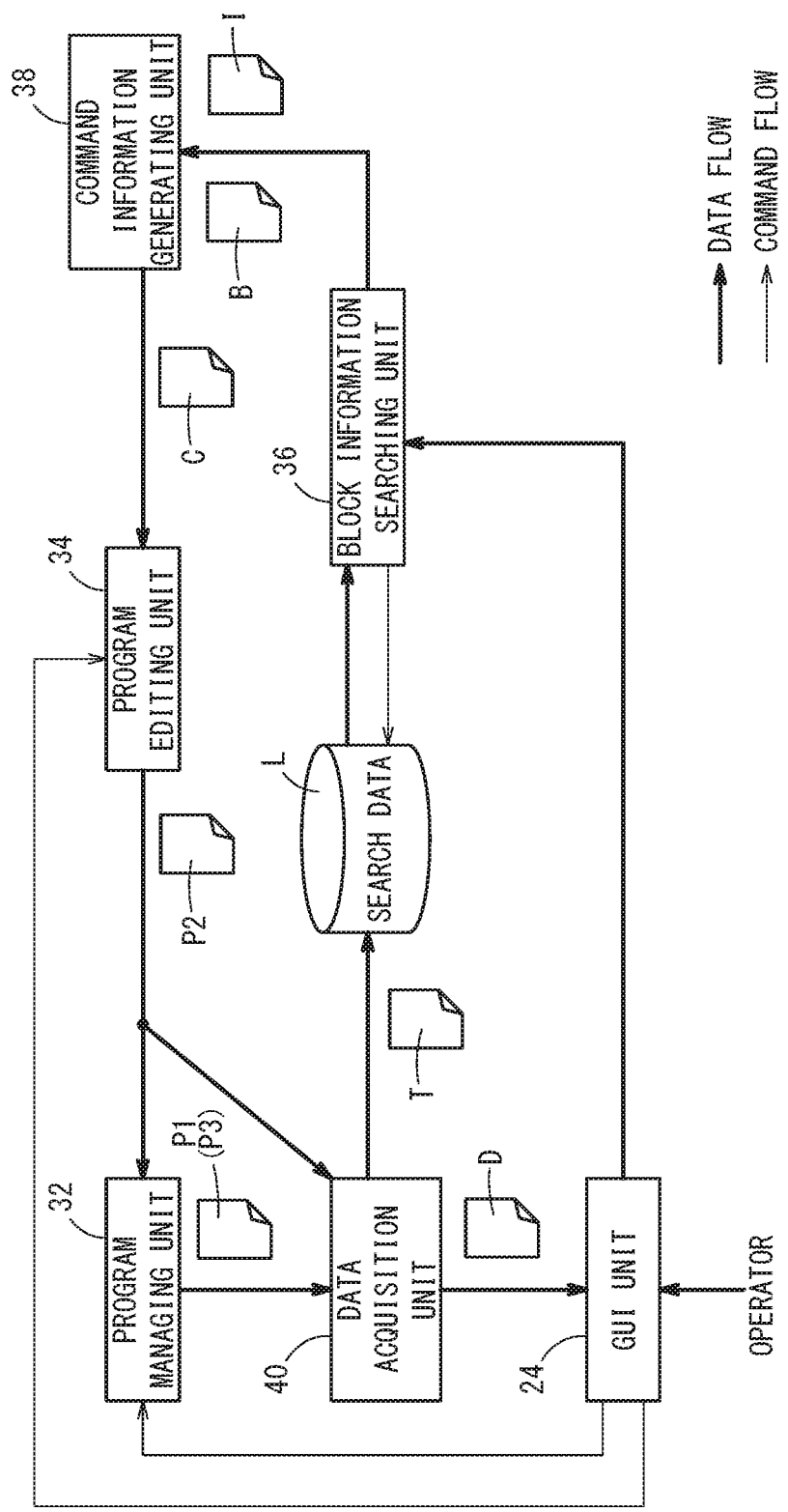
FIG. 2 is a functional block diagram showing the numerical controller shown in FIG. 1.

FIG. 2 is a functional block diagram of the numerical controller 10 shown in FIG. 1. In this figure, the thick solid arrows indicate data flow whereas the thin solid arrows indicate command flow.

The program managing unit 32 manages the machining program P to be edited. The program managing unit 32 selects an appropriate machining program P1 or P3 according to operation of the operator using the GUI unit 24, and outputs it to the data acquisition unit 40.

The data acquisition unit 40 analyzes the input machining program P and acquires path information T indicating the actual machining path 18 (strictly speaking, the machining path in simulation). Then, the data acquisition unit 40 creates display data D for a visible image of the actual machining path 18 with the path information T, and outputs the display data D to the GUI unit 24 (display unit 30).

The block information searching unit 36 creates instruction information I by use of operation data from the GUI unit 24, and searches for search data L using the instruction information I as a search value to create block information B. Here, the search data L is data formed by associating the above-described path information T with a block number.

The command information generating unit 38 updates the block information B using the instruction information I, generates command information C from the obtained block information B, and outputs the command information C to the program editing unit 34. The program editing unit 34 edits the machining program P1 in accordance with the input command information C to thereby obtain the machining program P2 being edited.

[Operation of Numerical Controller 10]

The numerical controller 10 according to this embodiment is thus configured. Next, the operation of the numerical controller 10 will be described focusing on the editing operation of the machining program P with reference to the flowcharts of FIGS. 3, 5, 8, 10, and 12.

In the following, it is assumed that the numerical controller 10 does not have the function of generating the machining program P, receives in advance the machining program P that has been created by the CAD/CAM terminal 12, and stores the machining program P in the storage unit 26.

<First Flowchart>

Figure 3:
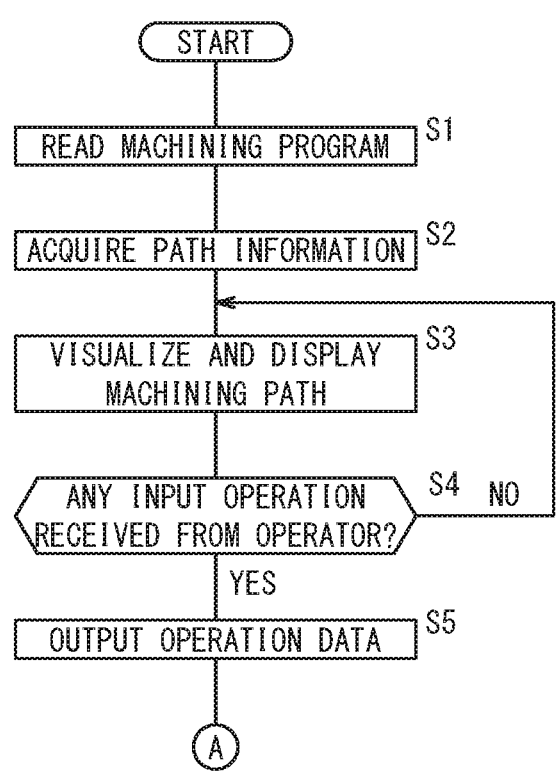
FIG. 3 is a first flowchart for explaining the operation of the numerical controller shown in FIGS. 1 and 2.

FIG. 3 is a flow chart showing a series of operations by the data acquisition unit 40 and the GUI unit 24 for acquisition of operation data.

At step S1, the data acquisition unit 40 reads a machining program P1 before editing, from the storage unit 26. At step S2, the data acquisition unit 40 analyzes the machining program P1 read out at step S1, and acquires the path information T indicating the target of the actual machining path 18. Here, the path information T includes the order of individual sections, and positional information (coordinate values or movement amounts) on the feature points.

At step S3, the GUI unit 24, based on the path information T acquired at step S2, visualizes and displays the target of the actual machining path 18 (which will be referred to hereinbelow as an original machining path 52) specified by the machining program P1 before editing. Prior to this visualization, the data acquisition unit 40 creates the display data D for the visible image of the original machining path 52 using the path information T. Then, the display unit 30 displays an image based on the display data D from the data acquisition unit 40.

Figure 4A:
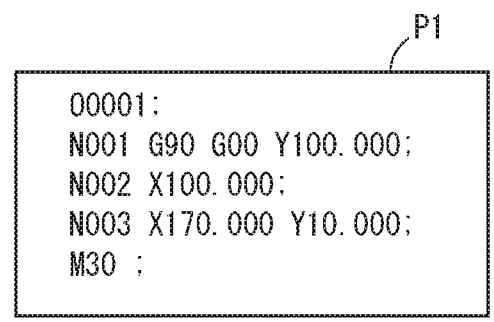
FIG. 4A is a diagram showing content of a machining program before editing.

As shown in FIG. 4A, the machining program P1 includes a main routine that is named "O0001" and ended by a command "M30". "O0001" is composed of four-block code statements (or NC statements), and the initial position of machining is assumed to be given as (X=10.000, Y=10.000).

"O0001" contains three movement commands on the X-Y plane. N001 block indicates an absolute command (G90), a rapid traverse movement command (G00), and a movement command (X=0.000, Y=100.000). N002 block indicates a movement command (X=100.000, Y=0.000). N003 block indicates a movement command (X=170.000, Y=10.000).

Meanwhile, in order to specify the positions of blocks, each block is allotted with a unique identifier (which will be referred to hereinbelow as a block number) in the machining program P1. More specifically, when the block number corresponding to the sequence number "N001" is "0000001", the block numbers corresponding to "N002" and "N003" are "0000002" and "0000003", respectively.

Figure 4B:
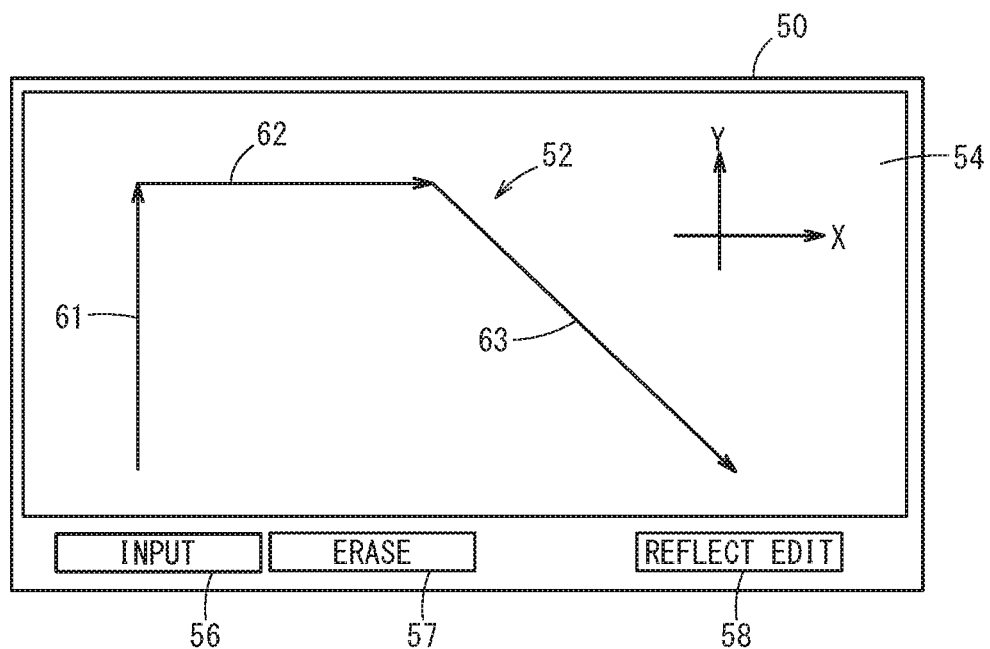
FIG. 4B is a screen diagram showing the display result of an original machining path specified by the machining program before edition shown in FIG. 4A.

As shown in FIG. 4B, in a display area 50 of the GUI unit 24 (the display unit 30), a drawing area 54 with the original machining path 52 being drawn thereon is arranged, and three buttons 56, 57 and 58 are further arranged on the lower side of the drawing area 54. The "INPUT" button 56 is a user control key for allowing the user to edit the original machining path 52. The "ERASE" button 57 is a user control to reset to the original machining path 52. The "REFLECT EDIT" button 58 is a user control to reflect the content of edition to the original machining path 52.

In the example of this figure, the original machining path 52 is formed of sequentially connected three linear sections 61, 62, and 63. In order to clarify the start and end points, the sections 61 to 63 are each indicated as an arrow. The section 61 corresponds to a movement command in the sequence number "N001" (block number "0000001"). The section 62 corresponds to a movement command in the sequence number "N002" (block number "0000002"). The section 63 corresponds to a movement command in the sequence number "N003" (block number "0000003").

At step S4, the control unit 20 determines whether or not an input operation performed by an operator through the display area 50, more specifically a writing operation in the drawing area 54 and a touch operation of the "INPUT" button 56, has been received. If the above operation has not been received (step S4: NO), the control returns to step S3, and step S3 is repeated until this operation is received. On the other hand, if this operation has been received (step S4: YES), the control proceeds to the next step S5.

Figures 6A, 6B:
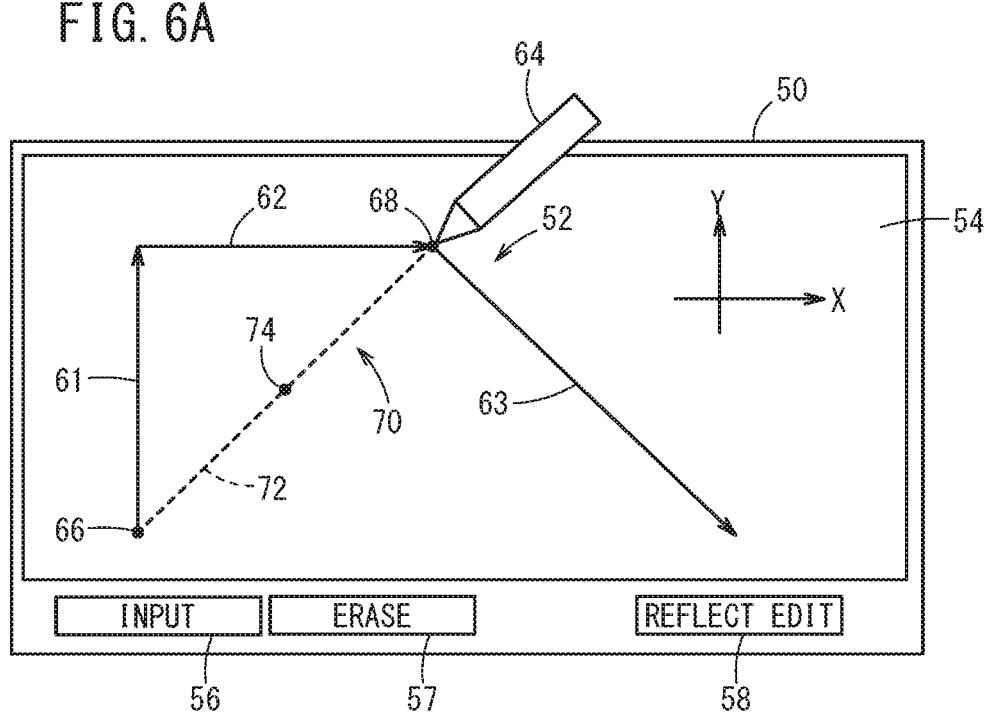
FIG. 6A is a screen transition diagram by input operation of an operator.
FIG. 6B is a diagram showing content of instruction information.

For example, as shown in FIG. 6A, in a case that the operator performs a writing operation of linearly tracing a line from a start point 66 to an end point 68 by use of a stylus pen 64, this operation corresponds to an operator's instruction to change part of the original machining path 52.

Hereinafter, the instructed (or specified) partial path is referred to as an indication route 70. In the example of this figure, the indication route 70 is formed of one linear section 72 (shown by a broken line).

At step S5, the control unit 20 outputs the operation data (including a plurality of coordinate values) obtained by the input operation at step S4 to the block information searching unit 36. In this way, the operations associated with the first flowchart (FIG. 3) are terminated.

<Second Flowchart>

FIG. 5 is a flowchart showing a series of operations for creating block information B by the block information searching unit 36.

At step S6, the block information searching unit 36 classifies the multiple feature points indicated by the operation data output at step S5 into three types of points, i.e., a start point, an end point and a relay point. Then, the block information searching unit 36 creates instruction information I that associates each feature point with its type.

As shown in FIG. 6B, the instruction information I includes "coordinate values" (absolute coordinate values) of the feature points and "type" of the feature points. When the first feature point is a start point 66, the coordinate values are (X=10.000, Y=10.000) and the type is "start point". When the second feature point is a relay point 74, the coordinate values are (X=50.000, Y=50.000) and the type is "relay point". When the third feature point is an end point 68, the coordinate values are (X=100.000, Y=100.000) and the type is "end point".

At step S7, the block information searching unit 36 acquires search data L corresponding to the machining program P1 before editing. Prior to acquisition, the data acquisition unit 40 creates search data L in which the path information T is associated with the block number, and temporarily stores it in the storage unit 26. Then, the block information searching unit 36 reads out the search data L from the storage unit 26 to acquire the search data L.

At step S8, the block information searching unit 36 searches all the block data constituting the search data L. Specifically, the block information searching unit 36 searches the search data L acquired at step S7 for block data with the type (in this case, "start point") and the coordinate values that match the instruction information I (search value).

The block information searching unit 36 sequentially reads the block data in a predetermined search direction (for example, in the ascending order of the block number) and determines whether or not there is data matching the search value (step S8a). When it is determined that such data exists (step S8a: YES), the block information searching unit 36 temporarily stores a block data containing the data as "first block data", and then proceeds to a next search (step S8b). On the other hand, if it is determined that no data exists (step S8a: NO), the control proceeds to a next search without executing step S8b.

The term "match" of the coordinate values may include not only the case where the coordinate values are equal but also cases where the distance between the two values falls within an allowable range. This is because when an operator specifies a position by use of the stylus pen 64, a positional error due to operator's operational accuracy may occur.

At step S9, when there are two or more first block data candidates, the block information searching unit 36 selects one candidate as the optimum first block data according to a preset priority order. For example, in the case where there are two or more candidates for the same start point, block data with the smallest distance to this start point may be selected.

At step S10, the block information searching unit 36 searches all the block data constituting the search data L. More specifically, the block information searching unit 36 searches the search data L acquired at step S7 for block data with the type (in this case, "end point") and the coordinate values of the feature point that match the instruction information I (search value).

The block information searching unit 36 sequentially reads the block data in a predetermined search direction, and skips searching of data outside the search range (step S10a). More specifically, if a block number is smaller than the block number corresponding to the first block data (step S10a: NO), the block information searching unit 36 stays at step Sa. On the other hand, if a block number is equal to or greater than the block number corresponding to the first block data (step S10a: YES), the control proceeds to the next step S10b.

The block information searching unit 36 sequentially reads out the block data in a predetermined search direction and determines whether or not there is data matching the search value (step S10b). If it is determined that such data exists (step S10b: YES), the block information searching unit 36 temporarily stores a block data containing the data as "second block data", and then proceeds to a next search (step S10c). On the other hand, if it is determined that no data exists (step S10c: NO), the control proceeds to a next search without executing step S10c.

At step S11, when there are two or more second block data candidates, the block information searching unit 36 may select one candidate as the optimum second block data according to the same priority order as step S9 or a different priority order.

At step S12, the block information searching unit 36 combines the first block data obtained at step S9 and the second block data obtained at step S11 to create block information B. Then, the block information searching unit 36 outputs the created block information B together with the instruction information I to the command information generating unit 38. In this way, the operation associated with the second flowchart (FIG. 5) is terminated.

Figure 7:
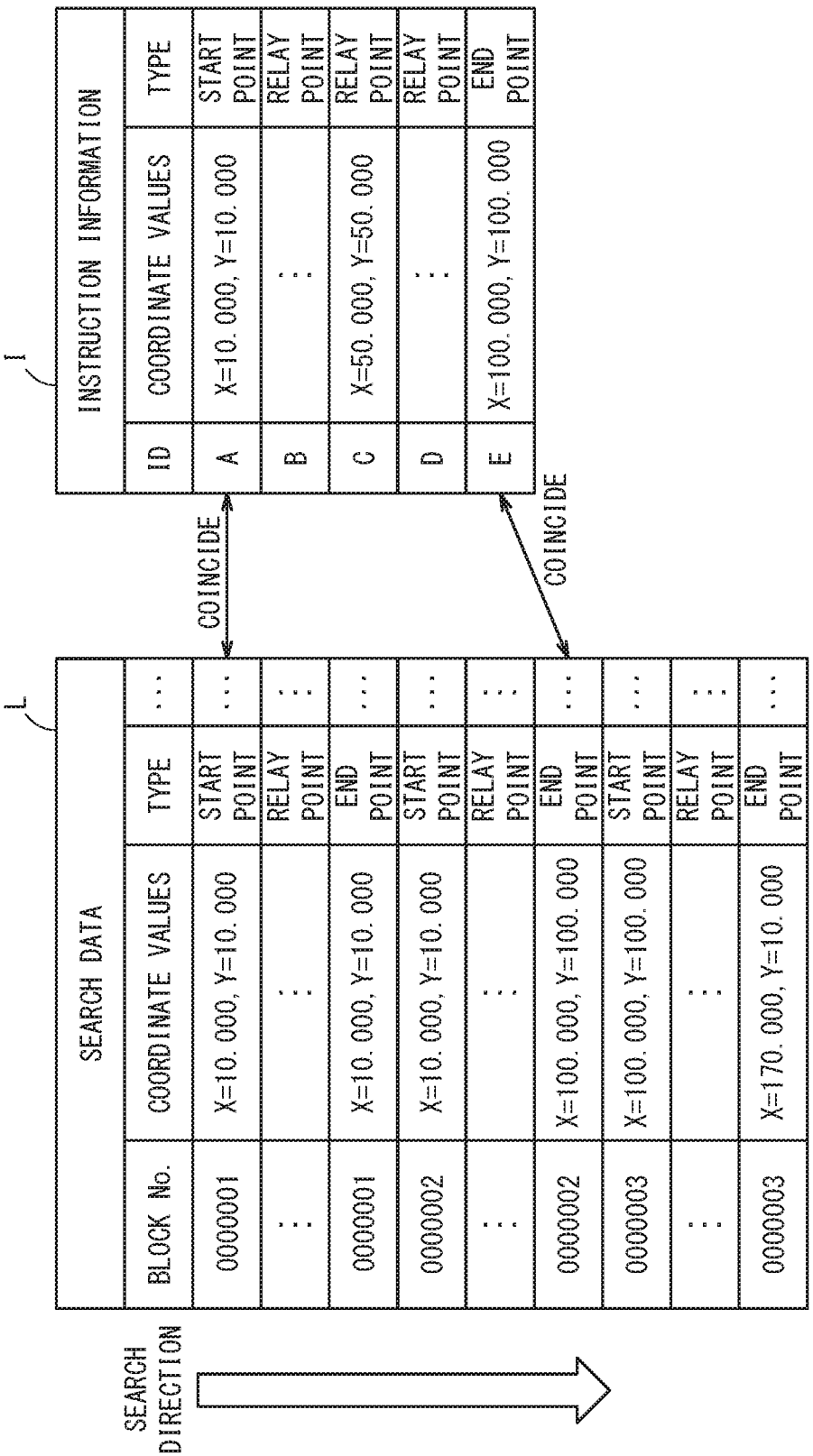
FIG. 7 is an explanatory diagram showing a search result by a block information searching unit.

FIG. 7 is an explanatory diagram showing a search result by the block information searching unit 36. It will be assumed that instruction information I and search data L are given as shown in this figure. Prior to the search of the first block data (step S8 in FIG. 5), among the instruction information I, block data whose ID is "A" is selected as a search value. Then, as a result of performing a search in the search direction, block data is obtained that contains a feature point whose type (start point) and coordinate values (X=10.000, Y=10.000) match the search value. Hereinafter, data having the block number "0000001" and the coordinate values "X=10.000, Y=10.000" is set as the first block data.

Subsequently, prior to searching for the second block data (step S10 in FIG. 5), among the instruction information I, block data whose ID is "E" is selected as a search value. Then, as a result of performing a search in the search direction, block data is obtained that contains a feature point whose type (end point) and coordinate values (X=100.000, Y=100.000) match the search value. Hereinafter, data having the block number "0000002" and coordinate values "X=100.000, Y=100.000" is set as second block data. Finally, by sequentially combining the first block data and the second block data, block information B (see FIG. 9A) can be obtained.

<Third Flowchart>

Figure 8:
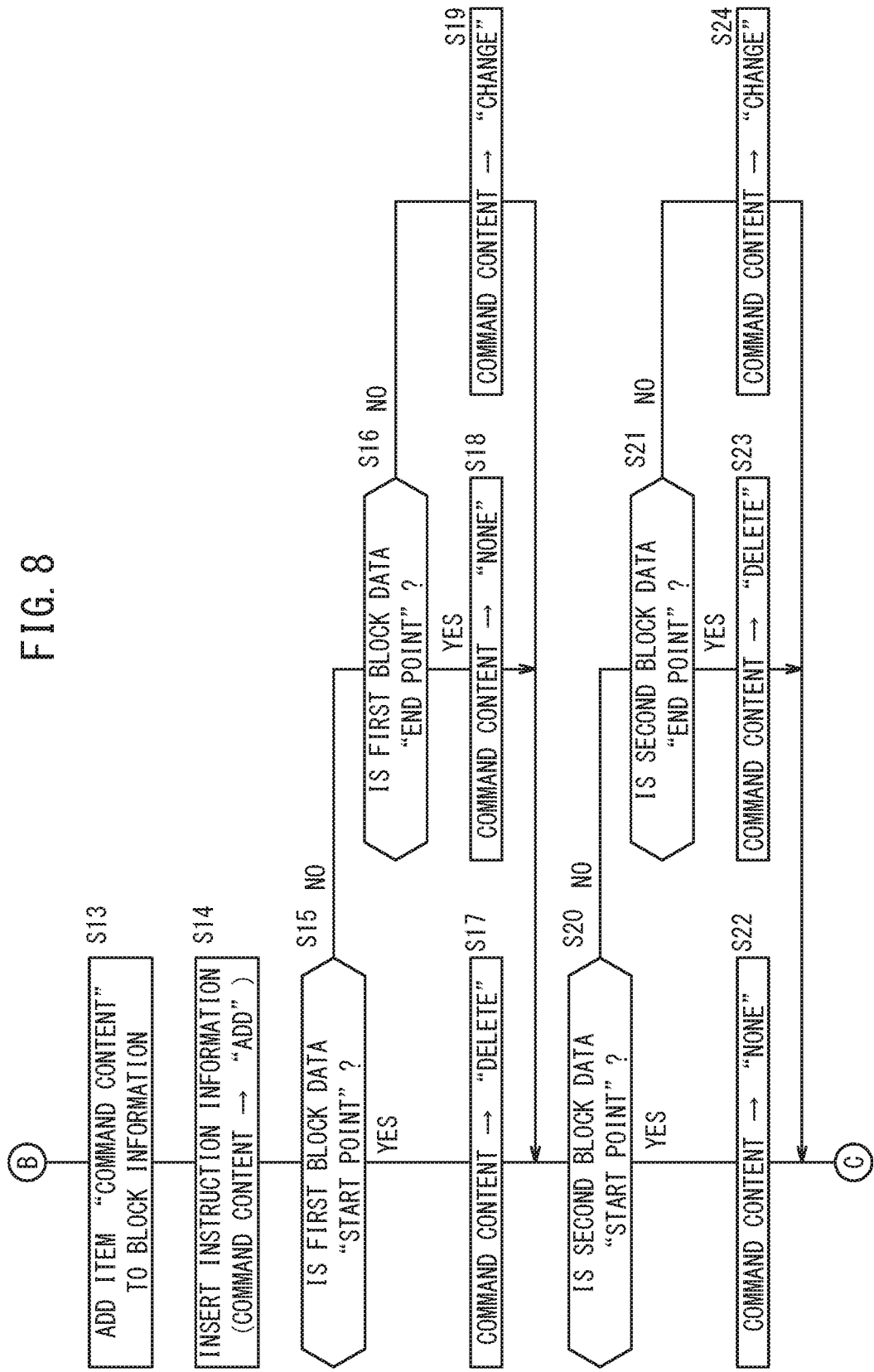
FIG. 8 is a third flowchart for explaining the operation of the numerical controller shown in FIGS. 1 and 2.

FIG. 8 is a flowchart showing a series of operations to update the block information B by the command information generating unit 38. FIGS. 9A to 9C are transition diagrams showing a process of updating the block information B.

At step S13, the command information generating unit 38 adds an item (data area) "command content" to the block information B output at step S12, and assigns all the data values of the command content with "add". At step S14, the command information generating unit 38 inserts block data corresponding to part or all of the instruction information I between the first block data and the second block data.

As shown in FIG. 9A, the initial block information B is composed of two pieces of block data. From this state, the command information generating unit 38 [1] adds the item "command content" (step S13 in FIG. 8), [2] inserts two or more pieces of block data (step S14 in FIGS. 8), and [3] duplicates the data values of "coordinate values" and "type" in the instruction information I in a predetermined order (step S14 in FIG. 8).

As shown in FIG. 9B, the block information B updated from FIG. 9A is composed of four pieces of block data. In this case, since it is presumed that the start point 66 and the end point 68 are connected by a single straight line, pieces of block data corresponding respectively to part of the instruction information I (more specifically, two pieces of block date corresponding respectively to "start point" and "end point") are inserted. Instead of this, in the case that pieces of block data corresponding to all of the instruction information I are inserted, it is possible to reproduce the shape of the indication route 70 in a faithful manner.

At steps S15 and S16, the command information generating unit 38 determines the type of the feature point in the first block data. Specifically, the command information generating unit 38 determines whether or not the type is "start point" (step S15), and further determines whether or not the type is "end point" as required (step S16).

If the type is "start point" (step S15: YES), a data value for "delete" is stored into the command content in the first block data (step S17). If the type is "end point" (step S15: NO→step S16: YES), a data value for "NONE" is stored into the command content in the first block data (step S18). If the type is "relay point" (step S15: NO→step S16: NO), a data value of "change" is stored into the command content in the first block data (step S19).

At steps S20 and S21, the command information generating unit 38 determines the type of the feature point in the second block data. Specifically, the command information generating unit 38 determines whether or not the type is "start point" (step S20), and further determines whether or not the type is "end point" as required (step S21).

If the type is "start point" (step S20: YES), the data value for "NONE" is stored into the command content in the second block data (step S22). If the type is "end point" (step S20: NO→step S21: YES), the data value for "delete" is stored into the command content in the second block data (step S23). If the type is "relay point" (step S20: NO→step S21: NO), the data value for "change" is stored into the command content in the second block data (step S24). In this way, the operation associated with the third flowchart (FIG. 8) is terminated.

Based on the state shown in FIG. 9B, the command information generating unit 38 [4] determines the data value of "command content" in the first block data (delete; step S17 in FIGS. 8), and [5] determines the data value of "command content" in the second block data (delete; step S23 in FIG. 8).

As shown in FIG. 9C, the block information B updated from FIG. 9B is composed of four pieces of block data. In this manner, all the data values of the block number, the coordinate values, the type and the command content are determined, whereby the block information B is completed.

In the first block data from the top, the block number is "0000001", the coordinate values are (X=10.000, Y=10.000) representing the position of the start point 66, the type is "start point", and the command content is "delete". In the second block data from the top, the block number is "NULL", the coordinate values are (X=10.000, Y=10.000) representing the position of the start point 66, the type is "start point" and the command content is "add".

In the third block data from the top, the block number is "NULL", the coordinate values are (X=100.000, Y=100.000) representing the position of the end point 68, the type is "end point", and the command content is "add". In the fourth block from the top, the block number is "0000002", the coordinate values are (X=100.000, Y=100.000) representing the position of the end point 68, the type is "end point", and the command content is "delete".

<Fourth Flowchart>

Figure 10:
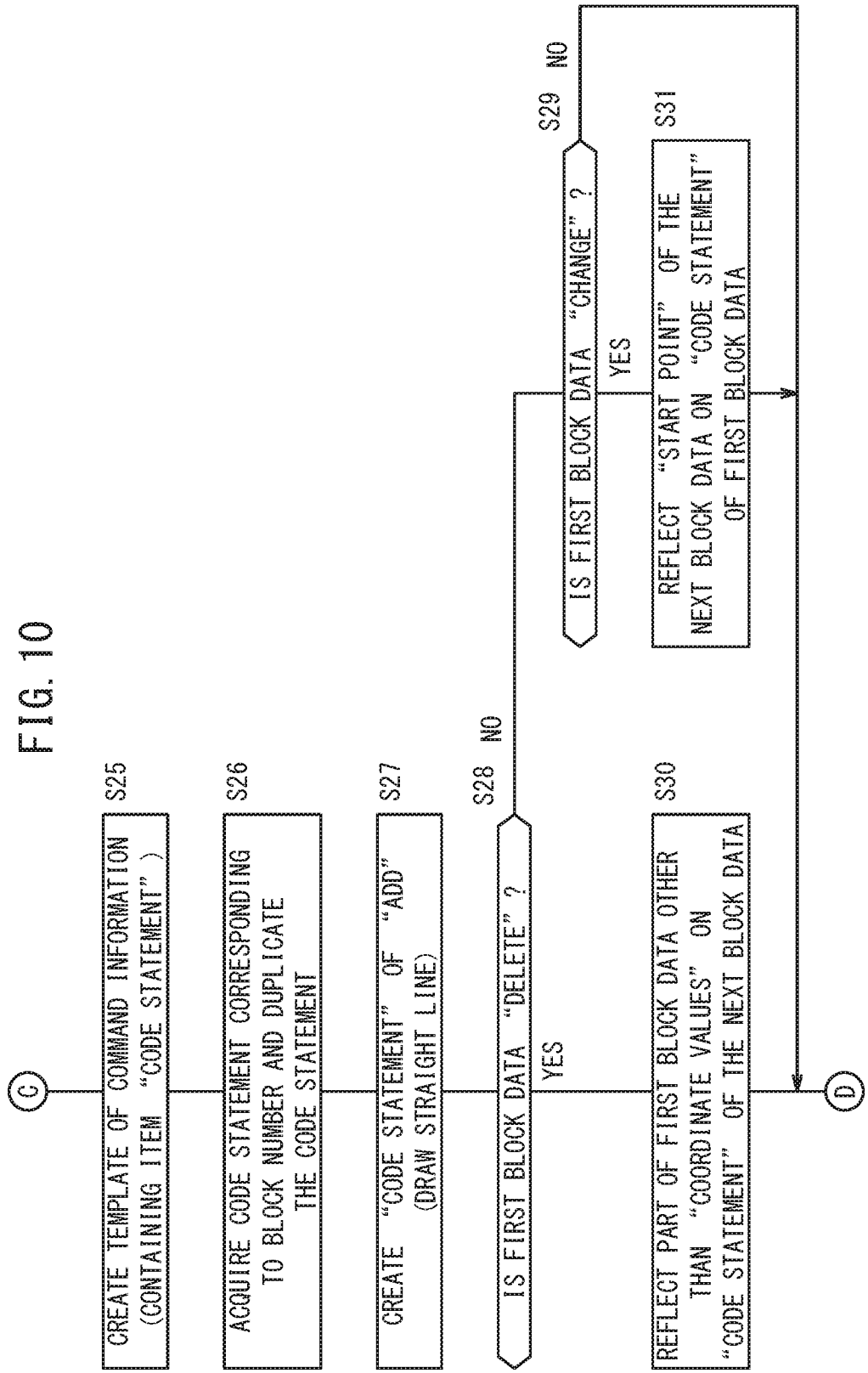
FIG. 10 is a fourth flowchart for explaining the operation of the numerical controller shown in FIGS. 1 and 2.

FIG. 10 is a flow chart showing a series of operations (first half) for generating the command information C by the command information generating unit 38. FIGS. 11A to 11C are transition diagrams showing an updating process of the command information C. Here, all information associated with the first block data (start point 66) is fixed.

At step S25, the command information generating unit 38 creates a template of command information C using the completed block information B. The command information C is an aggregate of block data including block numbers, code statements, and command content. At step S26, the command information generating unit 38 obtains the original code statement corresponding to the block number from the machining program P1 and duplicates the code statement to the corresponding place.

As shown in FIG. 11A, the command information C has four pieces of block data after execution of step S26. At this stage, content of the code statements has not yet been stored in the two pieces of block data each having the block number of "NULL".

At step S27, the command information generating unit 38 creates a code statement corresponding to the block data whose block number is "NULL" (that is, the command content is "add"). Specifically, a code statement is generated which connects the start point 66 and the end point 68 in the inserted block data with a straight line to form the section 72. For example, in the case that there is no relay point 74 between the start point 66 and the end point 68, or the start point 66, the end point 68, and the relay point 74 are on the same straight line, it should be noted that pieces of block data are integrated into one.

As shown in FIG. 11B, the command information C updated from FIG. 11A is composed of three pieces of block data. From this state, the command information generating unit 38 [4] slightly modifies the code statement in the first block data (steps S30 and S31 in FIG. 10). This is performed in order to keep consistency between the plural code statements adjacent to each other in deleting or changing the first block data for editing the machining program P1.

At steps S28 and S29, the command information generating unit 38 determines the command content in the first block data. Specifically, the command information generating unit 38 determines whether or not the type is "delete" (step S28) and further determines whether or not the type is "change" as necessary (step S29).

If the command content is "delete" (step S28: YES), a slight modification is made to reflect part of the code statement in the first block data on the block data next to the first block data (step S30). Specifically, the command information generating unit 38 deletes only the positional information (coordinate values or movement amount) from the original code statement corresponding to the first block data, and puts the remaining portion at the corresponding place in the code statement generated at step S27.

If the command content is "change" (step S28: NO→step S29: YES), a slight modification is made to reflect part of the code statement next to the first block data on the first block data (step S31). Specifically, the command information generating unit 38 acquires the coordinate values of the "start point" from the code statement generated at step S27 and replaces the coordinate values of the "end point" indicated by the code statement in the first block data with the acquired coordinate values of the "start point".

If the command content is "add" (step S28: NO→step S29: NO), there is no need to modify the code statement, and the control proceeds directly to the next step (S32). In this way, the operation associated with the fourth flowchart (FIG. 10) is terminated.

More specifically, FIG. 11A is a diagram showing the command information C after execution of step S25 (template creation) in FIG. 10. FIG. 11B is a diagram showing the command information C after execution of step S27 (generation of a code statement) in FIG. 10. Further, FIG. 11C is a diagram showing the command information C after execution of steps S30 and S31 (slight modification of the code statement) in FIG. 10.

As shown in FIG. 11C, the block information B updated from FIG. 11B is composed of three pieces of block data. In this way, by determining the first and second block numbers from the top, the code statements thereof, and the data values of the command content thereof, part of the command information C is completed.

At the first block from the top in the command information C, the block number is "0000001", the code statement is the same as the content before editing, i.e., "N001 G90 G00 Y100.000;", and the command content is "delete". In the second block from the top, the block number is "NULL", the code statement is "N001 G90 G00 X 100.000 Y 100.000;", and the command content is "add". In the third block from the top, the block number is "0000002", the code statement is the same as the content before editing, i.e., "N002 X100.000;", and the command content is "delete".

<Fifth Flowchart>

Figure 12:
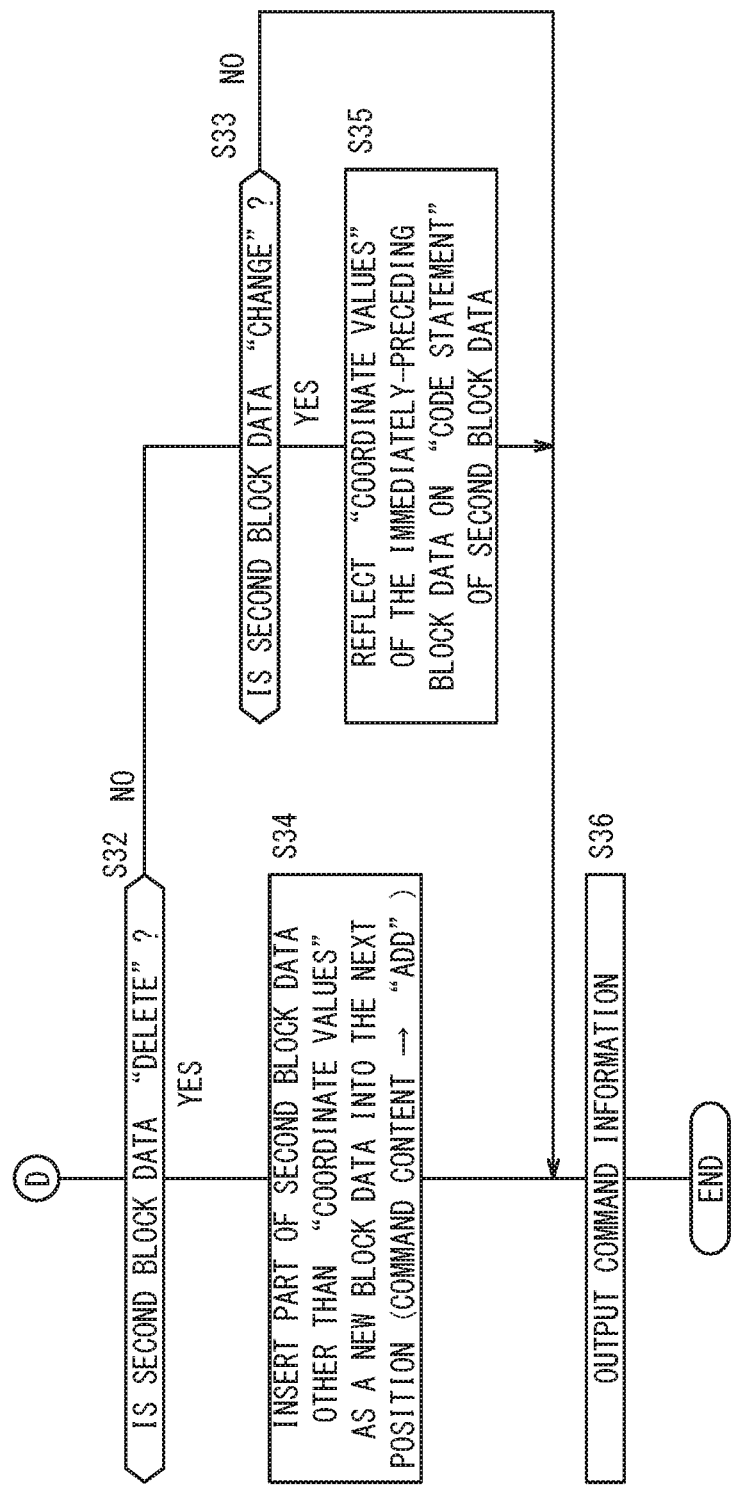
FIG. 12 is a fifth flowchart for explaining the operation of the numerical controller shown in FIGS. 1 and 2.

FIG. 12 is a flow chart showing a series of operations (the second half) for generating the command information C by the command information generating unit 38. All the information associated with the second block data (end point 68) is fixed.

From the state shown in FIG. 11C, the command information generating unit 38 [5] slightly modifies the code statement in the second block data (steps S34, S35 in FIG. 12). This is performed in order to keep consistency between multiple code statements adjacent to each other in deleting or changing the second block data for the purpose of editing the machining program P1, and in order that the machine tool 16 can be operated correctly.

At steps S32 and S33, the command information generating unit 38 determines the command content in the second block data. Specifically, the command information generating unit 38 determines whether or not the type is "delete" (step S32), and further determines whether or not the type is "change" as necessary (step S33).

If the command content is "delete" (step S32: YES), then one piece of block data is inserted right after the second block data and thereafter a desired data value or code statement is stored (step S34). More specifically, the command information generating unit 38 stores the data value for "add" into the command content, and also stores the remaining portion after the positional information has been deleted from the original code statement corresponding to the second block data (for example, the sequence number, preparation function, auxiliary function) into the "code statement".

If the command content is "change" (step S32: NO→step S33: YES), a slight modification is made so that part of the code statement in the second block data is reflected on the block data next to the second block data (step S35). Specifically, the command information generating unit 38 acquires the coordinate values of the "end point" from the code statement generated at step S27, and replaces the coordinate values of the "start point" indicated by the code statement in the second block data with the acquired coordinate values of the "end point".

Incidentally, when the command content is "add" (step S32: NO→step S33: NO), there is no need to modify the code statement, and the process directly advances to the next step (S36).

In this manner, all the data values of the third and fourth block numbers from the top, and the code statements and the command content thereof are fixed, so that the remaining part of the command information C is completed.

As shown in FIG. 13A, regarding the first block to the third block from the top of the command information C, since there is no change from FIG. 11C, the explanation will be omitted. In the fourth block from the top, the block number is "NULL", the code statement is "N002;", and the command content is "add".

At step S36, the command information generating unit 38 outputs the completed command information C to the program editing unit 34. In this way, the operation associated with the fifth flowchart (FIG. 12) is terminated.

<Description of Operation During Editing Work>

Thereafter, the program editing unit 34 edits the machining program P1 in accordance with the command information C, thereby obtaining the currently-edited machining program P2. Specifically, the program editing unit 34 sequentially reads out the command information C in units of block data, and adds, changes or deletes a code statement at the position of the obtained block number in accordance with the command content obtained. In the case of block data having a block number of "NULL", the code statement is edited at the current location (at the end of the recently-edited block).

FIG. 13A is a diagram showing the final content of command information C. FIG. 13B is a diagram showing the content of the machining program P2 under editing. As understood from the two drawings, when the command content is "delete", an opening parenthesis "(" is given at the beginning of the original code statement, whereas a closing parenthesis ")" is given at the end.

Then, after acquisition of the currently-edited machining program P2, the data acquisition unit 40 performs the above-described operations at steps S1 to S3 to thereby create the display data D for the visible image of an overlapped machining path 80. It should be noted that the data acquisition unit 40 skips reading of a character string (or a single character) within the range between the opening parenthesis and the closing parenthesis.

Figures 14A, 14B:
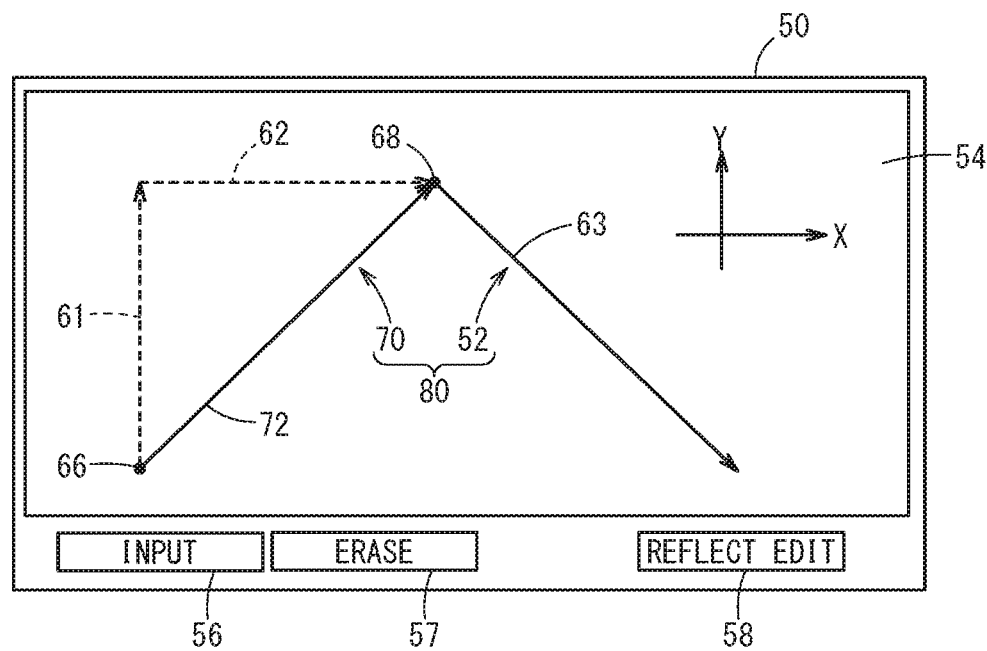
FIG. 14A is a screen diagram showing the display result of an overlapped machining path.
FIG. 14B is a screen diagram showing the display result displayed within a text editing area.

As shown in FIG. 14A, in the drawing area 54, which is part of the display area 50, there is drawn an overlapped machining path 80 in which the original machining path 52 and the indication route 70 are overlapped. In the overlapped machining path 80, sections 61 and 62 to be deleted are indicated by broken line arrows, a section 63 to be kept unchanged is indicated by a solid line arrow, and a section 72 to be added is indicated by a solid line arrow. In the example of this drawing, the added section 72 is relatively emphasized compared to the sections 61 and 62 to be deleted.

In this manner, the GUI unit 24 may lay the indication route 70 on the original machining path 52 in the display area 50 and display the indication route 70 (i.e., section 72) in a display form different from that of an area (that is, sections 61, 62) from the start point 66 to the end point 68 in the original machining path 52. As a result, the operator can grasp the difference between the machining paths before and after the change at a glance.

Further, as shown in FIG. 14B, a text editing area 82 that allows for text editing of the machining program P may be arranged in the display area 50 together with the above-described drawing area 54. In this case, similarly to the drawing area 54, the GUI unit 24 may display blocks (code statements) corresponding to the section 72 in a display form different from blocks (code statements) corresponding to the sections 61 and 62.

<Confirmation of Editing Work>

The operator repeatedly performs editing, simulation, trial run, and trial machining of the machining program P to thereby obtain a machining program P that satisfies the optimum machining conditions. At this point, the operator performs a confirming operation of editing via the display area 50, more specifically a touch operation of the "REFLECT EDIT" button 58 (FIG. 14A).

Then, after accepting the touch operation, the control unit 20 instructs the program editing unit 34 to fix the edited content. Then, the program editing unit 34 performs edition of deleting, from within the currently-edited machining program P2, the code statements given with specific characters together with the specific characters.

In this manner, the program editing unit 34 may delete the code statements with specific characters attached, and the specific characters, in response to the operator's confirming operation through the GUI unit 24, to thereby edit the machining program P. Thus, it is possible to prevent the edited content of the machining program P from being automatically determined against operator's intention.

Figure 15A:
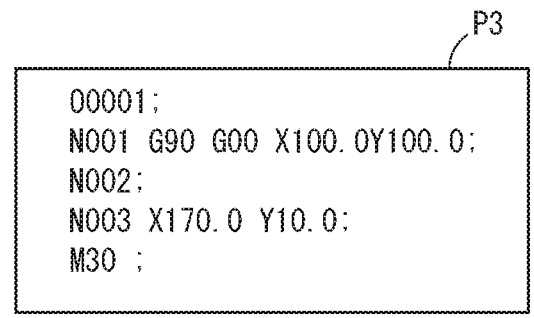
FIG. 15A is a diagram showing the content of a machining program after edition.

After acquisition of the machining program P3 after editing as shown in FIG. 15A, the data acquisition unit 40 performs the above-described steps S1 to S3. As a result, the data acquisition unit 40 creates display data D for a visible image of the target of an actual machining path 18 (which will be referred to hereinbelow as a new machining path 84) specified by the machining program P3 after editing.

Figure 15B:
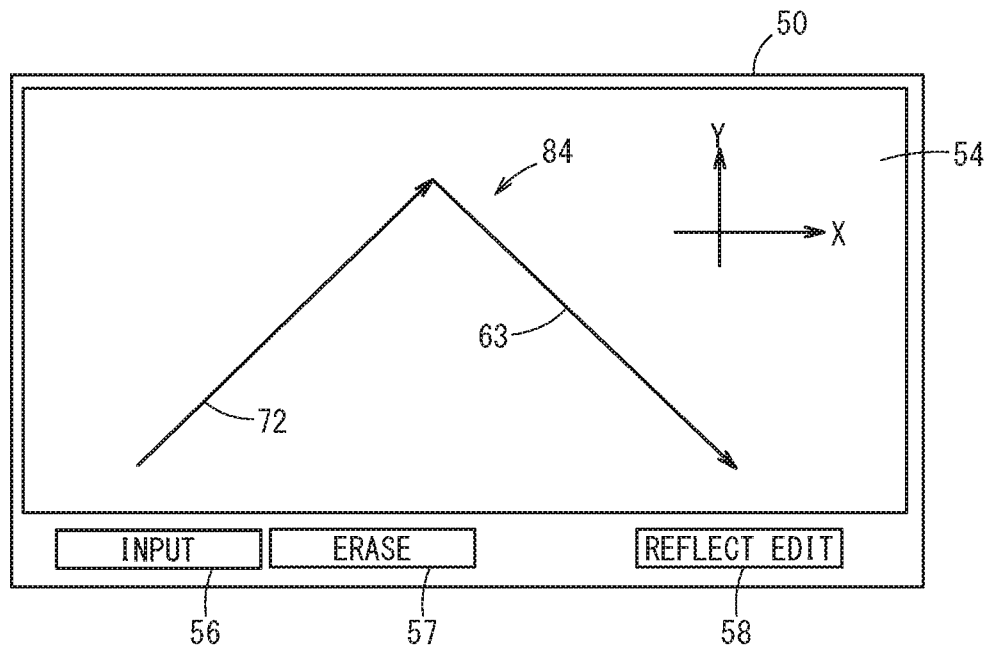
FIG. 15B is a screen diagram showing the display result of a new machining path, specified by the machining program after edition shown in FIG. 15A.

As shown in FIG. 15B, a new machining path 84 different from the original machining path 52 is drawn in the drawing area 54. The new machining path 84 is formed of sequentially connected two straight line sections 72 and 63. The section 72 corresponds to a new movement command at sequence number "N001". The section 63 corresponds to the original movement command at sequence number "N003". Sequence number "N002" is a dummy command without any machining operation.

As described above, the numerical controller 10 further includes a communication unit 22 capable of receiving the machining program P created by the CAD/CAM terminal 12 (external device), and may edit the received machining program P. In the case that the numerical controller 10 does not have a function of creating the machining program P, it is possible to modify and complete the machining program P by the numerical controller alone without re-creating the program using an external device.

<Cancel of Edited Work>

On the other hand, as a result of repetition of trial and error, the operator may reach the conclusion that it is preferable to use the unedited machining program P1 without any change. In this case, the operator performs an erase operation of the editing via the display area 50, more specifically, a touch operation of the "ERASE" button 57 (FIG. 14A).

Then, after accepting the touch operation, the control unit 20 instructs the program editing unit 34 to erase all edited content. Then, the program editing unit 34 performs edition of extracting the code statements given with specific characters from within the currently-edited machining program P2, and deleting only the specific characters.

In this manner, the program editing unit 34 may assign, to the code statements, specific characters that partially invalidate the readout, to thereby edit the machining program P. By deleting the specific characters later, the content of the code statement can be easily validated. In this case, although the type of the specific character is not particularly limited, in view of the restorability of the data, characters (or character strings) that are usually unused in the machining program P are preferably used.

[Effect of The Embodiment]

As described above, the numerical controller 10 is a machining program editing apparatus that edits a machining program P for causing a machine tool 16 to machine a workpiece W along an actual machining path 18 composed of two or more sections.

The numerical controller 10 includes: [1] a GUI unit 24 configured to display an original machining path 52 in a display area 50 and specify an indication route 70 having two points located on the original machining path 52 as a start point 66 and an end point 68, in accordance with an input operation performed by an operator through the display area 50; and [2] a program editing unit 34 configured to edit a machining program P1 indicating the original machining path 52 to thereby form a new machining path 84 by replacing an area from the start point 66 to the end point 68 on the original machining path 52, with the indication route 70 specified through the GUI unit 24.

In the above-described machining program editing method and editing program, the numerical controller 10 (machining program editing apparatus) executes: [1] a displaying step of displaying an original machining path 52 (step S3 in FIG. 3); [2] a specifying step of specifying an indication route 70 (step S4 in FIGS. 3); and [3] an editing step of editing a machining program P1 to form a new machining path 84 (FIGS. 14A to 15B).

Thus, the new machining path 84 can be created by replacing the area from the start point 66 to the end point 68 in the original machining path 52 with the indication route 70 specified through the GUI unit 24. Therefore, the operator can automatically perform edition of the machining program as intended, by input operation through a visually easy-to-understand interface, without directly handling code statements of the machining program P. As a result, it is possible to considerably reduce the man-hour for editing the machining program P.

The numerical controller 10 may further include a command information generating unit 38 configured to generate command information C indicative of a block number and command content in the machining program P, and the program editing unit 34 may, in accordance with the generated command information C, add, change or delete a code statement at a position corresponding to the block number to edit the machining program P.

Further, the command information generating unit 38 may generate the command information C, based on the coordinate values of the start point 66 and the coordinate values of the end point 68, specified by the code statement corresponding to the block number.

The numerical controller 10 may further include: a data acquisition unit 40 configured to analyze the machining program P and acquire search data L in which feature points of the sections 61 to 63 are associated with the block numbers; and a block information searching unit 36 configured to search the acquired search data L for the block number in which the feature point in the sections 61 to 63 coincides with the start point 66 or the end point 68.

After the search data L containing the data needed for editing is acquired from the machining program P having a large amount of data, a searching process is performed based on the search data L. Thus, it is possible to markedly reduce the time required for searching for feature points in the sections 61 to 63 and block numbers.

[Supplement]

It should be noted that the present invention is not limited to the above-described embodiment, but can be freely changed without departing from the scope of the present invention.

What is claimed is:

1. A machining program editing apparatus for editing a machining program that causes a machine tool to machine a workpiece along an actual machining path including two or more sections, comprising:
    a graphical user interface unit configured to display an original machining path in a display area, the original machining path defined by the machining program and the graphical user interface receiving an input operation performed by an operator using the graphical user interface to specify an indication route having an arbitrary point located in a first section and an arbitrary point located in a second section included in the original machining path respectively as a start point and an end point; and,
    a program editing unit configured to receive the input operation performed by the operator and edit the original machining path defined by the machining program to create a new machining path by replacing an area from the start point to the end point on the original machining path, with the indication route specified by the operator using graphical user interface unit, wherein the graphic user interface displays both the original machining path and the new machining path; and
    a command information generating unit configured to generate command information indicative of block numbers and command content in the machining program;
    wherein the command information generating unit generates the command information, based on coordinate values of the start point and coordinate values of the end point, specified by the code statement corresponding to each of the block numbers;
    a data acquisition unit configured to analyze the machining program and acquire search data in which feature points of the sections are associated with the block numbers; and
    a block information searching unit configured to search the search data acquired by the data acquisition unit for one of the block numbers in which one of the feature points of the sections coincides with the start point or the end point,
    wherein the program editing unit, in accordance with the command content of the command information generated by the command information generating unit, adds, changes or deletes a code statement at a position corresponding to each of the block numbers, and edits the machining program to change it from the original machining path to the new machining path.

2. The machining program editing apparatus according to claim 1,
    wherein the program editing unit edits the machining program by assigning a specific character for partially invalidating readout of data, to the code statement.

3. The machining program editing apparatus according to claim 2,
    wherein the program editing unit edits the machining program by deleting the code statement to which the specific character is assigned, together with the specific character, in accordance with a confirming operation performed by the operator using the graphical user interface unit.

4. The machining program editing apparatus according to claim 1,
    wherein the graphical user interface unit lays the indication route on the original machining path in the display area and displays the indication route in a display form different from a display form of the area from the start point to the end point on the original machining path.

5. The machining program editing apparatus according to claim 1, further comprising:
    a communication unit configured to receive the machining program created by an external device,
    wherein the machining program received by the communication unit is edited.

* * * * *